United States Patent Office 3,464,891
Patented Sept. 2, 1969

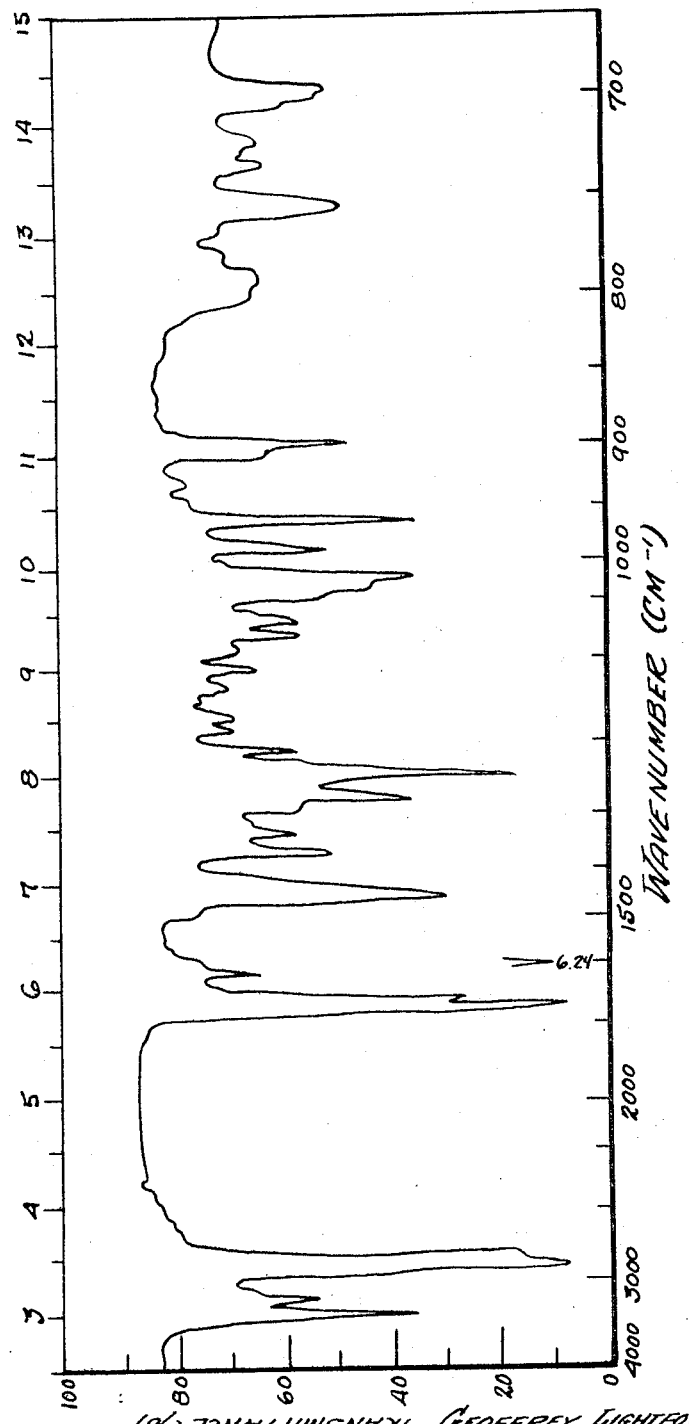

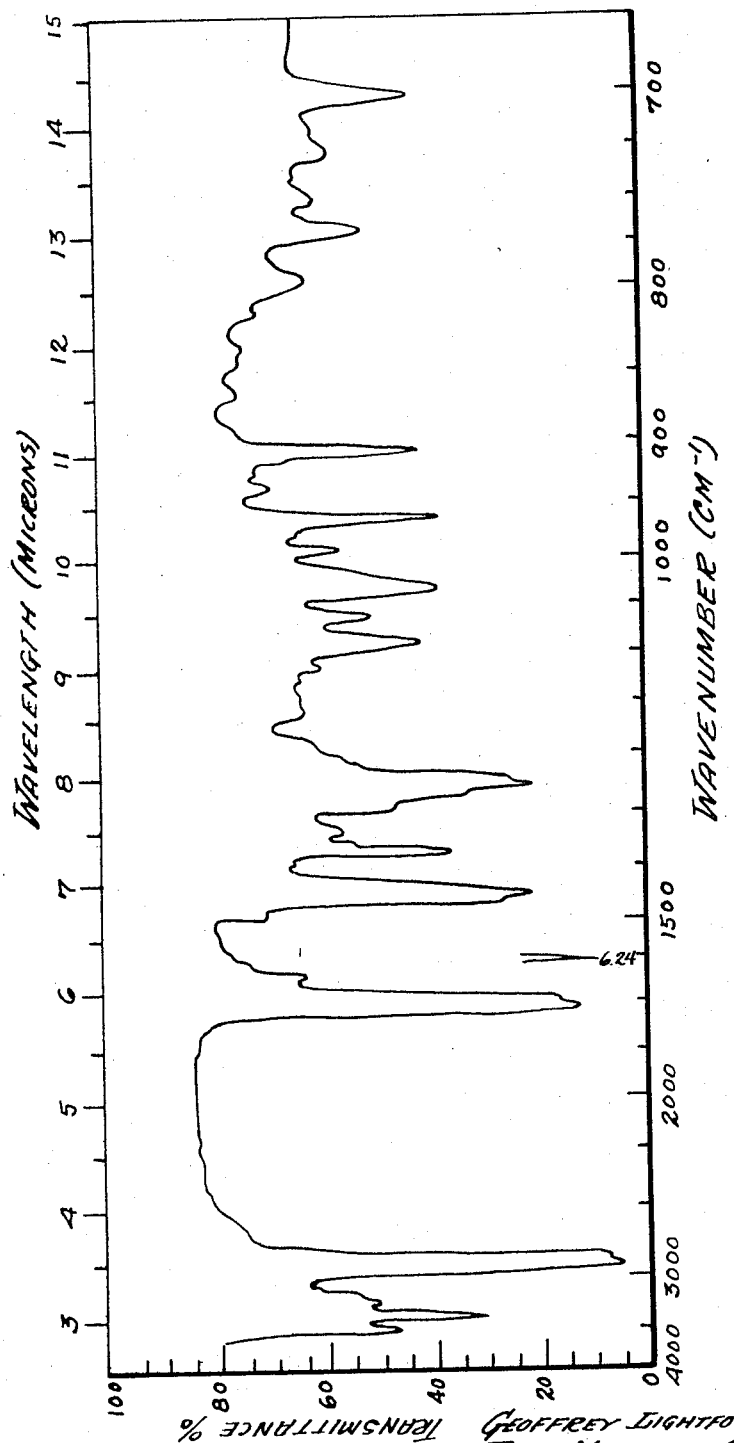

3,464,891
PROCESS FOR OBTAINING ANTIBIOTIC PRODUCTS BY CULTIVATING *HELMINTHOSPORIUM DEMATIOIDEUM*
Geoffrey Lightfoot Floyd Norris, Roy Neville Speake, and William Brian Turner, Macclesfield, England, assignors to Imperial Chemical Industries Limited, London, England, a corporation of Great Britain
No Drawing. Filed Feb. 1, 1965, Ser. No. 429,615
Claims priority, application Great Britain, Feb. 14, 1964, 6,269/64
Int. Cl. C12k 1/00
U.S. Cl. 195—81          10 Claims

ABSTRACT OF THE DISCLOSURE

The disclosure relates to two antibiotic products of molecular formula $C_{29}H_{35}NO_5$ and $C_{29}H_{37}NO_5$, respectively, and to a process for the manufacture of these products by cultivation of an active strain of *Helminthosporium dematioideum* followed by isolation of the products from the culture filtrate.

---

This invention relates to nitrogenous compounds and more particularly it relates to novel antibiotic products which possess antifungal properties, which produce effects on tissue culture cells and which are useful as intermediates.

According to the invention we provide the novel antibiotic products hereinafter referred to as MM. 18 and MM. 22.

The antibiotic product MM. 18 has a molecular formula of $C_{29}H_{35}NO_5$ and has a variable melting point, usually 182–185° C., but sometimes as high as 189–192° C. It has a constant and characteristic infra-red absorption spectrum which shows $V_{max}$ (liquid paraffin): 3350 (s.), 3210 (m.), 3140 (w.), 3060 (v.w.), 1714 (v.s.), 1692 (s.), 1623 (w.) and $V_{max}$ (bromoform): 3570 (w.), 3410 (w.), 3040 (w.), 3020 (sh.), 1717 (s.), 1695 (m.), 1625 (w.). It reacts with acetic anhydride in the presence of pyridine and forms a mono-acetate of melting point 176–181° C.

The antibiotic product MM. 22 has a molecular formula of $C_{29}H_{37}NO_5$ and has a melting point of 218–221° C. Its infra-red absorption spectrum shows $V_{max}$ (liquid paraffin): 3510 (w.), 3380 (s.), 3225 (w.), 3155 (w.), 3100 (w.), 3030 (v.w.), 1715 (u.s.), 1692 (v.s.), 1638 (w.), 1605 (w.) and $V_{max}$ (bromoform): 3520, 3410, 3300, 1712 (s.).

According to a further feature of the invention we provide a process for the manufacture of the antibiotic products MM. 18 and MM. 22 which comprises cultivation of an active strain of the organism *Helminthosporium dematioideum* in a nutrient medium followed by isolation of the desired products from the culture filtrate.

As a suitable strain of organism to be used in the above process there may be mentioned for example *Helminthosporium dematioideum* originating from the Commonwealth Mycological Institute located at Kew, England, and identified as IMI 74812.

The nutrient medium contains a source of assimilable carbon and a source of assimilable nitrogen. Suitable assimilable sources of carbon may be for example a polyhydric alcohol for example sucrose, glucose or glycerol, a source of polymerised carbohydrate for example starch, or naturally-occurring or synthetic oils and fats. The carbon source is generally present in the medium within the range of about 0.1–30% by weight and preferably within the range of about 3–8% by weight. Suitable assimilable sources of nitrogen may be an inorganic source or an organic source. It may be conveniently provided initially in the form of for example a nitrate of an alkali metal or an alkaline earth metal or an ammonium salt of an inorganic acid or an organic acid for example sodium, potassium, calcium or ammonium nitrate or ammonium tartrate, ammonium sulphate or ammonium phosphate. It may also be an amino-acid for example glycine, a seed meal for example cottonseed meal, or corn steep liquor, peptone, urea, yeast extract or meat extracts. The nitrogen source is generally present in the medium in an amount such that there is present between about 0.001% and about 1.0% and preferably between 0.01 and 0.50% of elementary nitrogen in the medium. The medium usually contains smaller quantities of essential elements such as phosphorus (potassium dihydrogen phosphate or di-ammonium hydrogen phosphate), magnesium (magnesium sulphate or magnesium carbonate), sulphur (a sulphate) and potassium (potassium chloride or potassium carbonate) and minute quantities of so-called trace elements such as iron, manganese, zinc, molybdenum or copper.

As suitable nutrient media there may be mentioned for example (i) a medium containing 7.0% glucose, 0.266% tartaric acid, 0.266% ammonium tartrate, 0.04% ammonium phosphate, 0.04% potassium carbonate, 0.027% magnesium carbonate, 0.016% ammonium sulphate, 0.0042% zinc sulphate and 0.0042% ferrous sulphate, (ii) a medium containing 3.0% glucose, 0.25% bactotryptone, 0.1% potassium dihydrogen phosphate, 0.05% magnesium sulphate and 0.05% potassium chloride and (iii) a medium containing 5.0% glucose, 0.2% sodium nitrate, 0.1% potassium dihydrogen phosphate, 0.05% magnesium sulphate and 0.001% ferrous sulphate, the media (ii) and (iii) also containing minute quantities of trace elements such as iron, manganese, zinc, molybdenum or copper.

The cultivation of the organism may be carried out within the temperature range of 15–35° C., preferably at a temperature of about 24° C., and growth of the organism is generally complete after about 13–15 days.

The desired antibiotic products MM. 18 and MM. 22 are present in the culture filtrate and may be isolated by filtration of the culture medium followed by extraction of the culture filtrate with an organic solvent such as chloroform thereby providing a solution of the mixed products. Further separation and purification may be carried out by means of chromatography using an absorption column of silica gel or alumina and elution solvents which are mixtures of chloroform and benzene or mixtures of ethyl acetate and petroleum ether (B.P. 60–80° C.).

As stated above, the products MM. 18 and 22 possess useful properties. MM. 18 is a valuable antifungal agent, MM. 18 and MM. 22 both produce effects on tissue culture cells and both are useful as intermediates in that MM. 22 can be oxidised to MM. 18 and MM. 18 itself can be reduced to MM. 22.

Thus according to a further feature of the invention we provide a process for the manufacture of MM. 18 which comprises oxidation of MM. 22 and a process for the manufacture of MM. 22 which comprises reduction of MM. 18.

The said oxidation may conveniently be carried out by means of chromium trioxide in the presence of pyridine as a reaction diluent or by means of manganese dioxide in the presence of chloroform as a diluent. The said reduction may be carried out by use of an equivalent amount of sodium borohydride in the presence of methanol.

The invention is illustrated but not limited by the following examples:

EXAMPLE 1

An aqueous nutrient medium is made up containing the following ingredients:

| | Percent w./v. |
|---|---|
| Tartaric acid | 0.266 |
| Mono-ammonium tartrate | 0.266 |
| Di-ammonium hydrogen phosphate | 0.04 |
| Potassium carbonate | 0.04 |
| Magnesium carbonate [$3MgCO_3,Mg(OH)_2,3H_2O$] | 0.027 |
| Ammonium sulphate | 0.016 |
| Zinc sulphate heptahydrate | 0.0042 |
| Ferrous sulphate heptahydrate | 0.0042 |
| Dextrolact | 2.5 |
| Yeast extract ("Difco" brand) | 0.01 |

This medium is placed in ceramic fermentation vessels (each one containing 1 litre of medium) and 5 N potassium hydroxide is added to the medium to adjust it to pH 6.0. The medium is sterilised by autoclaving and the pH is then 5.5. This medium is inoculated with 2 ml. of an inoculum of *Helminthosporium dematioideum* previously grown in a bottle slant on potato dextrose agar for 14 days.

The fermentation is carried out at a temperature of 24° C. for 13–15 days. The medium is then filtered and the culture filtrate (33 litres), which has a pH of 7.6 is extracted twice with chloroform using 3.3 litres each time. Subsequent stages in the purification procedure are carried out in brown glassware to protect the MM. 18 which is sensitive to light. The chloroform solution is evaporated in vacuo and the colourless solid residue (6.04 gm.) is dissolved in acetone (25 ml.) and added to silica gel (30 gm.). The mixture is stirred and heated to remove the acetone and the resulting dry silica gel is thus placed on top of a column (diameter=3.5 cm.) of silica gel (130 gm.) made up in benzene-chloroform (9:1 v./v.). The column is eluted with benzene-chloroform (9:1 v./v.) followed by benzene-chloroform (4:1 v./v.) as solvents. The small amounts of gums so obtained are discarded. Elution with benzene-chloroform (1:1 v./v.) as solvent gives fractions containing a mixture of colourless gum and solid (488 mg.). This material is crystallised from acetone-petroleum ether (B.P. 60–80° C.) and there is obtained a product, M.P. 178–185° C. The latter is then crystallised twice further from acetone-petroleum ether (B.P. 60–80° C.) and there is thus obtained a colourless crystalline solid (MM. 18), M.P. 182–185° C. When a sample is subjected to elementary analysis, it is found to have C, 72.75, 72.85, 73.0; H, 7.3, 7.3, 7.4; N, 3.0, 3.1, 3.1%. There is no halogen, sulphur, methoxy group or acetoxy group present in the molecule. The molecular weight found (X-ray method) is 472±10. The molecular formula $C_{29}H_{35}NO_5$ requires C, 72.9; H, 7.4; N, 2.9% and a molecular weight of 478.

MM. 18 forms a mono-acetate, M.P. 176–181° C. from interaction of MM. 18 and acetic anhydride in the presence of pyridine. Elementary analysis shows C, 71.6, 71.7; H, 7.3, 7.4; acetoxy group 9.2%. The molecular formula $C_{31}H_{37}NO_6$ requires C, 71.65; H, 7.2; acetoxy group 9.2%. Its infra-red absorption spectrum shows $V_{max}$ (liquid paraffin): 3195 (s.), 3095 (s.), 1732 (u.s.), 1703 (u.s.), 1623 (s.) and $V_{max}$ (bromoform): 3380 (w.), 3010 (w.), 1720 (s., br.), 1688 (s.) and 1615 (w.).

The column above is further eluted with benzene-chloroform (1:1 v./v.) as solvent followed by chloroform alone as solvent. The first fractions obtained are mixtures, M.P. 170–210° C. and then there is obtained a colourless solid (2.69 gm.) which is finally crystallised from acetone. There is thus obtained a colourless crystalline solid (1.61 gm.) which is MM. 22, M.P. 218–221° C. Elementary analysis shows C, 72.75, 72.9, 72.5; H, 7.9, 7.9, 8.0; N, 3.0% and no halogen, sulphur, methoxy group or acetoxy group present in the molecule. The molecular formula $C_{29}H_{37}NO_5$ requires C, 72.6; H, 7.8; N, 2.9%.

EXAMPLE 2

The product MM. 22 (100 mg.) is added to a solution of chromium trioxide (40 mg.) in pyridine (4 ml.) and the reaction mixture is kept at 18–22° C. for 18 hours. It is then poured into water and the aqueous mixture is extracted with ethyl acetate. The ethyl acetate extract is thoroughly washed with water, dried over sodium sulphate and the solvent is then removed in vacuo. The residual gum is purified by chromatography on silica gel in chloroform/benzene mixtures. The early eluates are evaporated to dryness in vacuo. The material so obtained is crystallised from acetone-petroleum ether (60–80° C.) and there is thus obtained a product, M.P. 182–185° C. which is identical with an authentic sample of MM. 18 as shown by comparison of infra-red spectra.

EXAMPLE 3

MM. 22 (48 mg.) is dissolved in chloroform (10 ml.), manganese dioxide (200 mg.) is added, and the mixture is stirred for 3 days in a brown flask. The manganese dioxide is then removed by filtration through celite and the filtrate is evaporated thus providing a white solid. This solid is subjected to chromatographic purification on silica gel using chloroform-benzene mixtures and the early fractions are evaporated. There is thus obtained a solid which crystallises from acetone-light petroleum (B.P. 60–80° C.) as needles, M.P. 182–185° C. which is identical with an authentic sample of MM. 18.

EXAMPLE 4

MM. 18 (50 mg.) is dissolved in methanol (3.5 ml.) and is then treated with 1 equivalent of sodium borohydride. After 15 minutes, the solution is acidified with dilute hydrochloric acid and the mixture is extracted with chloroform. The chloroform extract is then evaporated to dryness and the residual solid is subjected to chromatographic purification on silica gel using chloroform-benzene mixtures. Evaporation of the appropriate fractions gives a solid which when crystallised from acetone-light petroleum (B.P. 60–80° C.) has M.P. 218–221° C. and is identical with an authentic sample of MM. 22.

The infra-red absorption spectra for the products MM. 18 and MM. 22 are shown in FIGURES 1 and 2, respectively.

What is claimed is:

1. A process for the manufacture of a compound selected from the group consisting of (1) the antibiotic product having a molecular formula of $C_{29}H_{35}NO_5$ and melting point, between 182–192° C., with an infra-red absorption spectrum which shows $V_{max}$ (liquid paraffin): 3350 (s.), 3210 (m.), 3140 (w.), 3060 (v.w.), 1714 (v.s.), 1692 (s.), 1623 (w.) and $V_{max}$ (bromoform): 3570 (w.), 3140 (w.), 3040 (w.), 3020 (sh.), 1717 (s.), 1695 (m.), 1625 (w.) and a monoacetate thereof of melting point 176–181° C., said product being soluble in chloroform and methanol and (2) the antibiotic product having a molecular formula of $C_{29}H_{37}NO_5$ and a melting point of 218–221° C. with an infra-red absorption spectrum which shows $V_{max}$ (liquid paraffin): 3510 (w.), 3380 (s.), 3225 (w.), 3155 (w.), 3100 (w.), 3030 (v.w.), 1715 (u.s.), 1692 (v.s.), 1638 (w.), 1605 (w.) and $V_{max}$ (bromoform): 3520, 3410, 3300, 1712 (s.), said product being soluble in chloroform and ethyl acetate, which comprises cultivation of the strain of the organism *Helminthosporium dematioideum* identified as I.M.I. 74812 in a nutrient medium followed by isolation of the said products from the culture filtrate.

2. Process as claimed in claim 1 wherein the nutrient medium contains a source of assimilable carbon within the range of 0.1–30% by weight.

3. Process as claimed in claim 2 wherein the assimilable carbon source is within the range of 3–8% by weight.

4. Process as claimed in claim 2 wherein the source of assimilable carbon is selected from the group consisting of sucrose and glucose.

5. Process as claimed in claim 1 wherein the nutrient medium contains a source of assimilable nitrogen such that there is present between 0.001% and 1.0% by weight of elementary nitrogen in the medium.

6. Process as claimed in claim 5 wherein the assimilable source of nitrogen is such that there is present between 0.01% and 0.5% by weight of elementary nitrogen.

7. Process as claimed in claim 5 wherein the assimilable source of nitrogen is selected from the group consisting of sodium nitrate, potassium nitrate, calcium nitrate, ammonium nitrate, ammonium tartrate, ammonium sulphate and ammonium phosphate.

8. Process as claimed in claim 1 wherein the nutrient medium is selected from the group consisting of (i) a medium containing 7.0% glucose, 0.266% tartaric acid, 0.266% ammonium tartrate, 0.04% ammonium phosphate, 0.04% potassium carbonate, 0.027% magnesium carbonate, 0.016% ammonium sulphate, 0.0042% zinc sulphate and 0.0042% ferrous sulphate, (ii) a medium containing 3.0% glucose, 0.25% bactotryptone, 0.1% potassium dihydrogen phosphate, 0.5% magnesium sulphate and 0.05% potassium chloride and (iii) a medium containing 5.0% glucose, 0.2% sodium nitrate, 0.1% potassium dihydrogen phosphate, 0.05% magnesium sulphate and 0.001% ferrous sulphate, the media (ii) and (iii) also containing minute quantities of a member of the group consisting of iron, manganese, zinc, molybdenum and copper as trace elements.

9. Process as claimed in claim 1 wherein the cultivation of the organism is carried out within the temperature range of 15–35° C.

10. Process as claimed in claim 9 wherein the cultivation of the organism is carried out at a temperature of 24° C.

References Cited

Miller, The Pfizer Handbook of Microbial Metabolites, 1961, The Blakiston Division, McGraw-Hill Book Company, Inc., New York, pp. 256, 257, 258, 259, 267, and 367 QR 84 M5 C2.

ALBERT T. MEYERS, Primary Examiner

D. M. STEPHENS, Assistant Examiner

U.S. Cl. X.R.

424—122